May 18, 1965 J. S. SIMMS 3,184,219
TENSIONING UNITS
Filed June 11, 1963 4 Sheets-Sheet 1
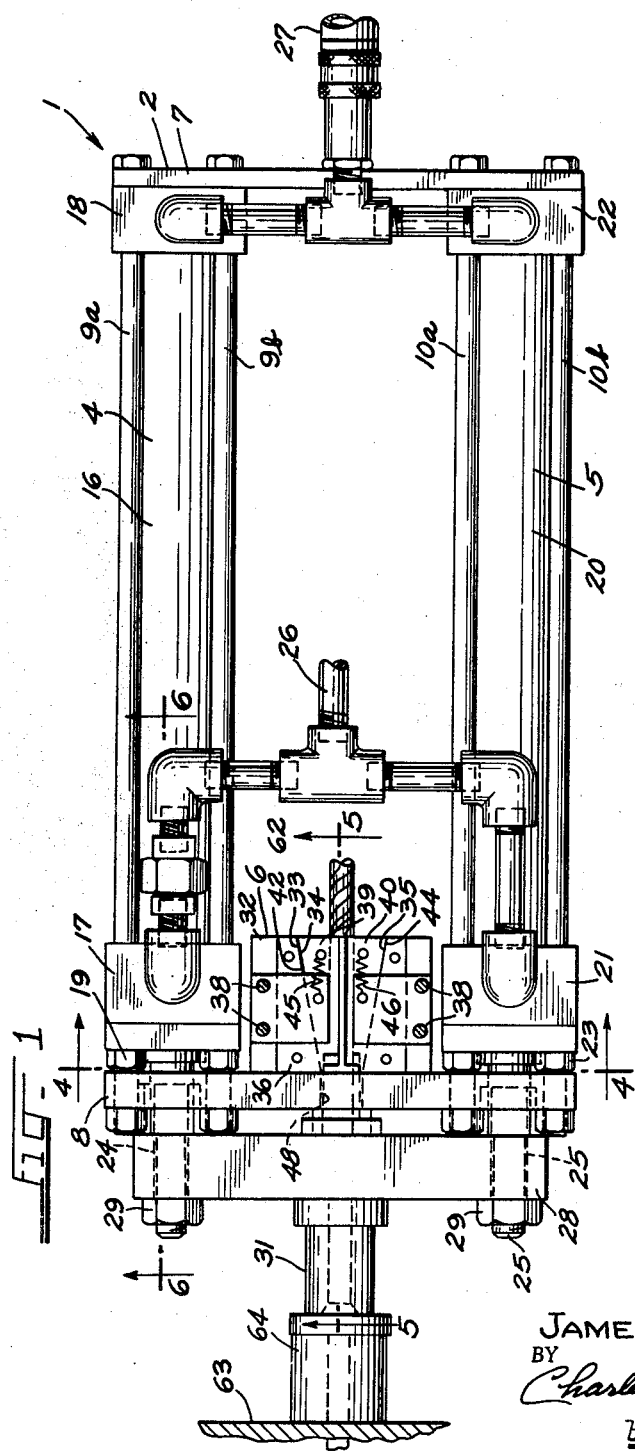
INVENTOR.
JAMES S. SIMMS
BY Charles B. Cannon
His Atty.

May 18, 1965
J. S. SIMMS
3,184,219
TENSIONING UNITS
Filed June 11, 1963
4 Sheets-Sheet 2
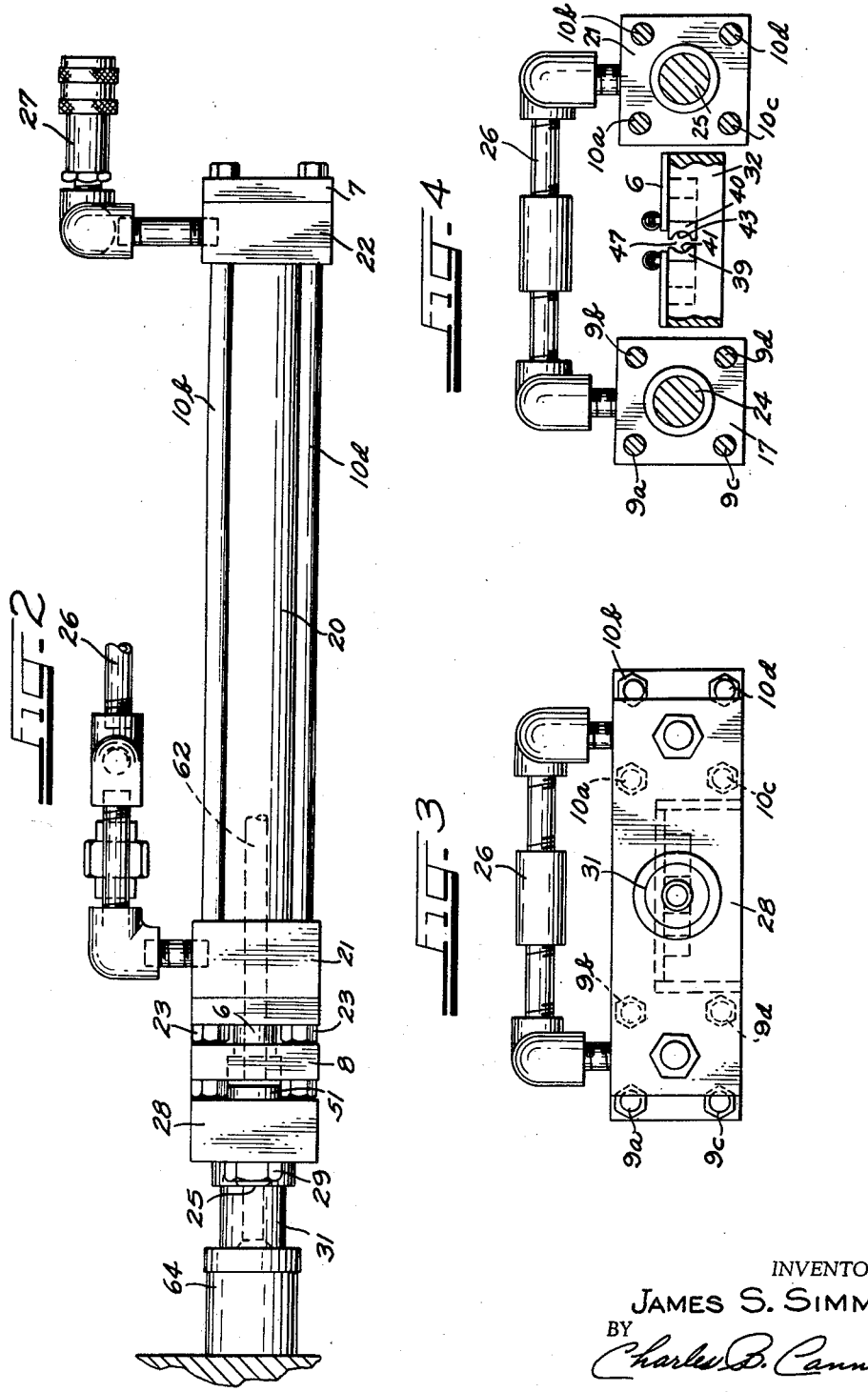
INVENTOR.
JAMES S. SIMMS
BY
Charles B. Cannon
His Att'y.

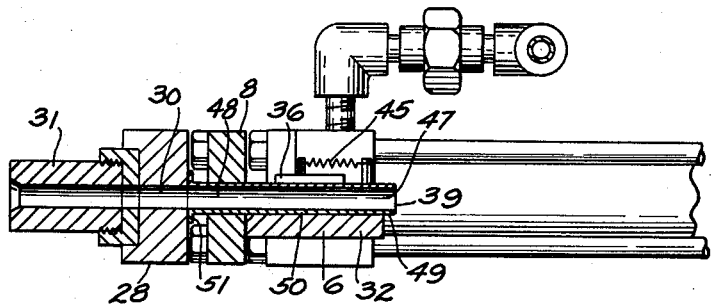
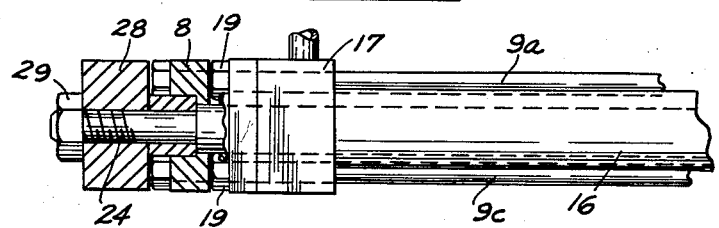
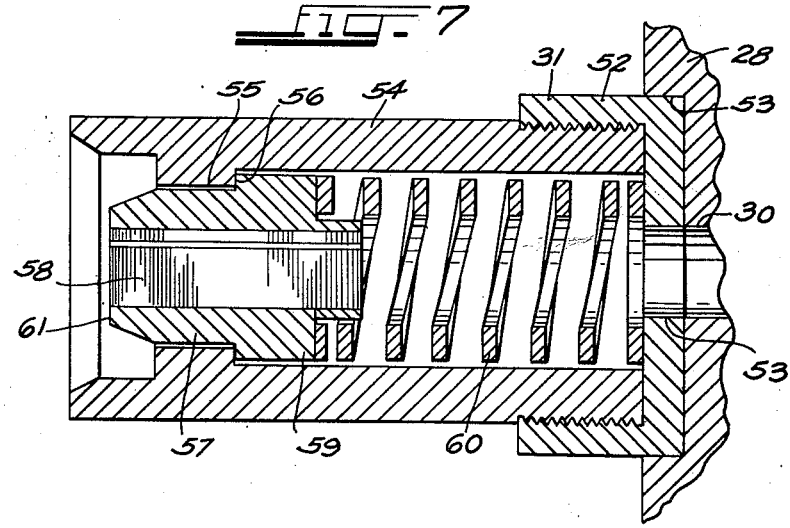

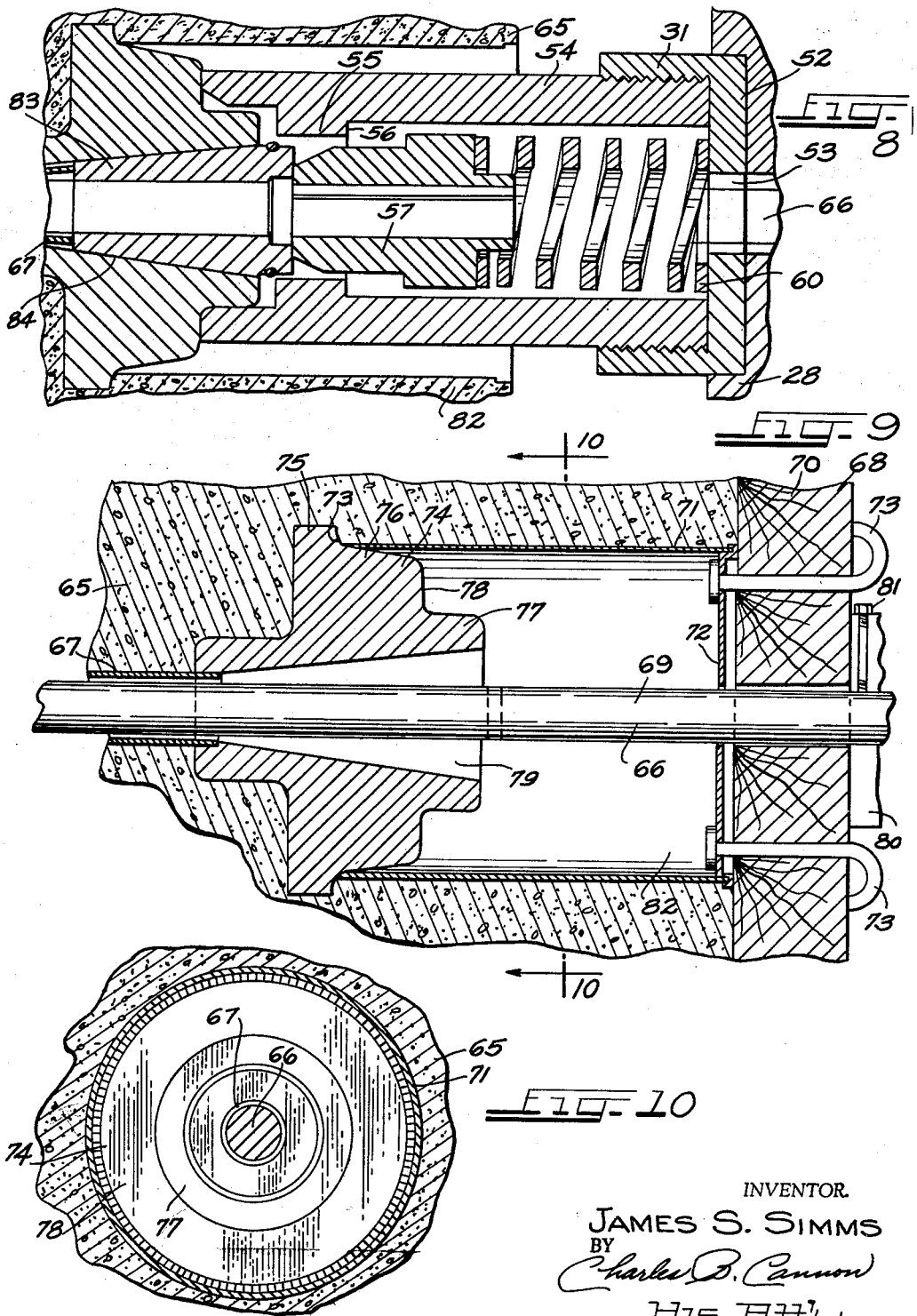

United States Patent Office 3,184,219
Patented May 18, 1965

3,184,219
TENSIONING UNITS
James S. Simms, 5301 W. Patterson Ave., Chicago, Ill.
Filed June 11, 1963, Ser. No. 286,991
10 Claims. (Cl. 254—29)

This invention relates to tensioning units and, more particularly, to tensioning units which are particularly well adapted for tensioning cables used in stressed concrete, and the like.

It is a primary object of the present invention to afford a novel tensioning unit for tensioning cables and the like.

In the production of stressed concrete wherein, in the finished product cables embedded in the concrete are under stress, two methods have been commonly used. One of those methods involves what will be referred to herein as "pre-tensioning" of the cables, that is, the cables are tensioned the desired amount prior to the pouring of the concrete therearound. The other method involves what will be referred to herein as "post-tensioning" of the cables, that is, the cables are tensioned to the desired amount after the concrete in which they are embedded has hardened to the desired compressive strength.

Devices have been heretofore known in the art for tensioning cables in the production of stressed concrete, and the like. However, such devices as have been heretofore known in the art have had several inherent disadvantages such as, for example, not affording a device which is practical and efficient for use in both pre-tensioning and post-tensioning such cables; being heavy, and not readily portable; being large and cumbersome in size; being difficult and complicated in construction and operation; or not being reliable in operation, and the like. It is an important object of the present invention to overcome such disadvantages.

Another object of the present invention is to afford a novel tensioning device wherein the parts thereof are constituted and arranged in a novel and expeditious manner enabling the device to be effectively used both for pre-tensioning and post-tensioning cables in stressed concrete.

A further object is to enable cables to be post-tensioned in a novel and expeditious manner in the production of stressed concrete.

Another object is to afford a novel device for holding post-tensioned cables in stressed concrete.

Another object is to afford a novel tensioning device of the aforementioned type which is relatively small and compact in size.

Another object is to afford a novel tensioning device of the aforementioned type which is readily transportable.

Yet another object of the present invention is to afford a novel tensioning device of the aforementioned type which may be quickly and easily attached to and released from a cable to be tensioned.

A further object is to afford a novel tensioning device of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a fragmentary top plan view of a tensioning device embodying the principles of the present invention, showing the unit in position to effect a pre-tensioning operation;

FIG. 2 is a fragmentary side elevational view of the tensioning device shown in FIG. 1;

FIG. 3 is a front elevational view of the tensioning device shown in FIG. 1;

FIG. 4 is a transverse sectional view taken substantially along the line 4—4 in FIG. 1;

FIG. 5 is a fragmentary, detail sectional view taken substantially along the line 5—5 in FIG. 1;

FIG. 6 is a fragmentary, detail sectional view taken substantially along the line 6—6 in FIG. 1;

FIG. 7 is an enlarged, fragmentary sectional view taken substantially along the line 7—7 in FIG. 2;

FIG. 8 is a sectional view similar to FIG. 7, but showing the device disposed in operative position for post-tensioning a cable;

FIG. 9 is a view of a portion of the structure shown in FIG. 8, prior to the application of the device thereto; and FIG. 10 is a sectional view taken substantially along the line 10—10 in FIG. 9.

A tensioning unit 1 embodying the principles of the present invention is shown in the drawings to illustrate the presently preferred embodiment of the present invention.

The tensioning unit 1 embodies, in general, an elongated supporting frame 2 on which are mounted two fluid-actuated units 4 and 5, with an elongated cable-gripping member, in the form of a chuck 6 mounted on the frame 2.

The supporting frame 2 embodies a rear end plate 7 and a front end plate 8, disposed in parallel spaced relation to each other, with eight elongated rods 9a–9d and 10a–10d extending through the plates 7 and 8 in parallel spaced relation to each other. The four rods 9a–9d define one side of the frame 2 and extend through the plates 2 and 8 in such position relative to each other as to define the respective corners of a square, FIG. 3. The other rods 10a–10d define the other side of the frame 2, and extend through the plates 2 and 8 in such position as to define the respective corners of another square, FIG. 3.

The fluid-actuated unit 4 includes an elongated cylinder 16 having a front cylinder head 17 and a rear cylinder head 18 mounted on the respective opposite end portions thereof. The fluid-actuated unit 4 is disposed between the end plates 7 and 8 of the frame 2, with the rear face of the cylinder head 18 disposed in abutting engagement with the front face of the rear end plate 7, and with the cylinder 16 disposed between the rods 9a–9d. The rods 9a–9d extend through respective corner portions of the cylinder heads 17 and 18 and nuts 19 are mounted on the front end of each of the rods 9a–9d in position to clamp the fluid-actuated unit 4 between the end plates 7 and 8 of the frame 2.

Similarly, the fluid-actuated unit 5 includes an elongated cylinder 20 having a front cylinder head 21 and a rear cylinder head 22 mounted on the respective opposite end portions thereof. The fluid-actuated unit 5 is mounted on the frame 2 with the cylinder 20 disposed between the rods 10a–10d, and with the rear end of the cylinder head 22 disposed in abutting engagement with the front face of the rear end plate 7 of the frame 2. The rods 10a–10d extend through respective corners of the cylinder heads 21 and 22, and nuts 23 are mounted on the front end of each of the rods 10a–10d in position to clamp the fluid-actuated unit 5 between the end plates 7 and 8 of the frame 2.

The fluid-actuated units 4 and 5 include pistons 24 and 25, respectively, slidably mounted in the cylinders 16 and 20, respectively, for reciprocation longitudinally thereof. The front cylinder heads 17 and 21, and the rear cylinder heads 18 and 22, may be connected through suitable controls, not shown, by suitable conduit means such as, for example, 26 and 27, respectively, to a suitable source of working fluid, such as, for example, a hydraulic gear pump, not shown, for selectively feeding working fluid into and out of the ends of the cylinders 16 and 20 and thereby reciprocating the pistons 24 and 25.

The pistons 24 and 25 of the fluid-actuated units 4 and 5 extend forwardly through the front end plate 8 of the frame 2, and a crossbar 28 is mounted on the front end portions of the piston rods 24 and 25 forwardly of the end plate 8. The crossbar 28 is secured to the pistons 24 and 25 by suitable means such as nuts 29, and is movable with pistons 24 and 25 forwardly from and rearwardly toward the frame 2. The crossbar 28 has an opening 30 extending therethrough in longitudinal alignment with the longitudinal center line of the frame 2, and a substantially cylindrical-shaped abutment member 31 is mounted on and projects forwardly from the crossbar 28 in axial alignment with the opening 30, for a purpose which will be discussed in greater detail presently.

The chuck 6, FIGS. 1, 4, and 5, includes a base 32 in the form of a substantially rectangular-shaped block, having an upwardly opening recess 33 extending horizontally therethrough from front to rear. The recess 33 is substantially wedge-shaped, the side walls 34 and 35 thereof sloping outwardly away from each other at an acute angle from the front to the rear of the base 32, FIG. 1. Two elongated, substantially flat retainer plates 36 and 37 are secured to opposite sides of the upper face of the base 32 by screws 38 and project inwardly toward each other into overlying relation to the recess 33.

Two substantially wedge-shaped clamping jaws 39 and 40 are mounted in the recess 33 for reciprocation forwardly and rearwardly therein. The jaw 39 has one side wall portion 41, which is substantially arcuate-shaped in transverse cross-section, disposed in parallel relation to the longitudinal center line of the opening 33, and facing toward the jaw 40. The side wall 42 of the jaw 39, remote from the side wall 41 thereof slopes outwardly and rearwardly away from the side wall 41 and is normally disposed in flat, abutting engagement with the side wall 34 of the opening 33. Similarly, the jaw 40 has a side wall portion 43, which is substantially arcuate-shaped in transverse cross-section, disposed in substantially parallel relation to the longitudinal center line of the opening 33, and facing toward the jaw 39. The jaw 40 also includes another side wall 44, remote from the side wall 33, the side wall 44 sloping outwardly and rearwardly at an acute angle to the side wall 43, and being normally disposed in flat abutting engagement with the side wall 35 of the opening 33.

The jaws 39 and 40 are of such size that when they are disposed in operative position in the opening 33, they are engaged by the retainer plates 36 and 37 with a relatively snug, but freely slidable fit. A tension coil spring 45 is connected between the retainer plate 36 and the rear end portion of the jaw 39 in position to urge the jaw 39 forwardly, FIGS. 1 and 5. Similarly, a tension coil spring 46 is connected between the retainer plate 37 and the rear end portion of the jaw 40 in position to urge the jaw 40 forwardly, FIG. 1.

As may be seen in FIG. 4, the jaws 39 and 40 are so disposed in the base 32, that the side walls 41 and 43 thereof define an opening 47, which is substantially circular in transverse cross-section, extending from front to rear through the chuck 6. The chuck 6 is secured to the rear face of the front end plate 8 of the frame 2 by suitable means such as, for example, by welding the base 32 thereof to the rear face of the end plate 8. The chuck 6 is disposed in such position on the end plate 8, that the opening 47 is disposed in axial alignment with a somewhat larger opening 48 extending horizontally through the center of the end plate 8, FIGS. 1 and 5.

A tubular member 49, having an elongated shank portion 50, and an enlarged head 51 on one end thereof, is mounted on the rear face of the crossbar 28 by suitable means such as welding, with the enlarged head 51 disposed in abutting engagement with the rear face of the crossbar 28, and with the shank 50 extending rearwardly therefrom in axial alignment with the opening 30 in the crossbar 28. The internal diameter of the tubular member 49 is preferably the same as the diameter of the opening 30, and the tubular member 49 is so disposed on the crossbar 28 that during movement of the crossbar 28 and the end plate 8 toward and away from each other, the shank 50 of the tubular member 49 may move into and out of the opening 48 in the end plate 8. The shank 50 of the tubular member 49 is of such length that when the crossbar 28 is disposed in its closest relation to the end plate 8, the rear end of the shank 50 projects rearwardly from the end plate 8 a sufficient distance to abuttingly engage the front ends of the jaws 39 and 40 outwardly of the opening 47, and hold the jaws 39 and 40 in the rearwardmost position in the base 32, FIG. 5.

The abutment member 31 includes an internally threaded end cap 52 mounted in a recess 53 in the front face of the crossbar 28, FIGS. 5 and 7, and secured to the crossbar 28 by suitable means such as welding. The end cap 52 has an opening 53a extending therethrough in axial alignment with the opening 30 in the crossbar 28, and the abutment member 31 includes a substantially cylindrical-shaped housing 54 threaded into the end cap 52 and projecting forwardly therefrom in axial alignment with the opening 53. The housing 54 has an inwardly projecting annular boss 55 affording a rearwardly facing shoulder 56 for restrainingly engaging an elongated piston or actuator element 57, FIG. 7. The piston 57 is disposed in the housing 54 in coaxial relation thereto, and has an opening 58 extending longitudinally therethrough, the opening 58 being of the same size, and disposed in longitudinal alignment with the opening 53a.

The piston 57 has a radially outwardly projecting flange 59 on the rear end thereof, which is complementary in transverse cross-section to the bore of the housing 54 rearwardly of the shoulder 56. A compression coil spring 60 is disposed in the housing 54 in engagement with the cap 52 and the piston 57 in position to yieldingly urge the piston 57 forwardly in the housing 54 toward engagement of the flange 59 with the shoulder 56. When the piston 57 is disposed in such position, the forward end portion 61 thereof projects forwardly of the flange 55, FIG. 7.

With the tensioning unit 1 constructed in the manner disclosed herein, it affords an effective unit for both pretensioning and post-tensioning cables in stressed concrete, and the like. For example, in the use of the tensioning unit 1 in the pre-stressing of cables, the cable to be tensioned, such as, for example, a cable 62, FIGS. 1 and 2, may first be strung through a form, such as the form 63, into which the concrete is to be poured. One end of the cable 62, not shown, may be secured to one side of the form 63, not shown, in any suitable manner. The other end of the cable 62, such as the end thereof shown in FIGS. 1 and 2, may then be fed outwardly from the other side of the form 63 through a suitable gripping chuck 64. The chuck 64 may be any suitable type of chuck available on the market, wherein a cable, such as the cable 62, may be pulled outwardly therethrough in a direction away from the form 63, and which is operable to grip the cable 62 to prevent its movement inwardly toward the form 63, but I prefer that the chuck 64 be of the type shown in my copending application, Serial No. 263,182, filed March 6, 1963.

Thereafter, the free end of the cable 62 extending outwardly from the gripping chuck 64 may be fed through the opening 30, the opening 48, and the opening 47 into position wherein it projects rearwardly from the chuck 6. When the jaws 39 and 40 are in rearwardmost position, as shown in FIG. 5, the opening 47 is large enough to readily accommodate the cable 62; and even if the jaws 39 and 40 should be in a forward position, the springs 45 and 46 are of such strength that they may be readily overcome by rearward manual pressure on the cable 62 to thereby permit ready insertion of the cable 62 rearwardly through the opening 47.

With the cable 62 inserted through the chuck 6, the tensioning unit 1 may be moved forwardly along the cable 62 into position wherein the front end of the housing 54 of the abutment member 31 is disposed in abutting engagement with the rear end of the gripping chuck 64. Hydraulic fluid may then be fed through the piping 27 into the rear head 18 and 22 of the fluid-actuated units 4 and 5 to thereby cause the pistons 24 and 25 to move forwardly relative to the cylinders 16 and 20. This relative movement of the pistons 24 and 25 and the cylinders 16 and 20 is effective to move the crossbar 28 and the frame 2 away from each other, to thereby move the chuck 6 rearwardly away from the gripping chuck 64. The rearward movement of the chuck 6 causes the jaws 39 and 40 to firmly grip the portion of the cable 62 disposed therebetween, so that the rearward movement of the chuck 6 is effective to tension the cable between the gripping chuck 64 and the chuck 6. After the cable 62 has thus been tensioned the desired amount, the operation of the fluid-actuated units 4 and 5 may be reversed, to thereby cause the pistons 24 and 25 to be retracted into the cylinders 16 and 20, and thus move the crossbar 28 and the frame 2 toward each other. As the crossbar 28 and the frame 2 move toward each other, the shank 50 of the tubular member 49 moves into engagement with the front ends of the jaws 39 and 40 and pushes the jaws 39 and 40 rearwardly in the base 32 to thereby release the clutch 6 from clamping engagement with the cable 62. The gripping chuck 64 being effective to holdingly grip the cable 62 against inward movement relative thereto, the cable 62 remains tensioned in the form 63, even though the tensioning unit 1 has thus been released therefrom.

This tensioning operation may be repeated on each cable, such as the cable 62, to be tensioned in the form 63. Thereafter, the concrete may be poured into the form 63, and after the concrete has hardened to the desired compressive strength the holding devices for the ends of the cables may be released from the cables, such as, for example, by severing the cables between the form 63 and the hardened concrete; and the form 63 may then be removed. The cables 62 remain under tension in the hardened concrete, the concrete adhering to the peripheral sides thereof.

My novel tensioning unit 1 also affords a device which is practical and efficient in the post-tensioning of such cables in a novel and expeditious manner. In this operation, the cables to be tensioned are tensioned after the concrete in which they are embedded has hardened to the desired compressive strength, the portions of the cables disposed in the concrete having a suitable covering or coating thereon for preventing the adherence of the concrete to the cable.

Such an operation is illustrated in FIGS. 8–10, wherein concrete 65, embodying such a cable 66, coated with a suitable adhesive repellent 67, is shown disposed in a form 68 in FIG. 9. Only one end of one cable 66, and only a fragment of the concrete 65 and of one side of the form 68 are shown in FIG. 9, because it is believed that such is sufficient for disclosure of the present invention. It will be understood that the concrete 65 would normally have several cables, such as the cable 66, disposed therein in parallel spaced relation to each other; that the other side, not shown, of the form 68 would be identical to the side thereof which is shown; and that both ends of each cable would be mounted in the concrete 65 and the respective sides of the form 68 in the same manner as the end 69 of the cable 66 shown in FIG. 9.

As shown in FIG. 9, the side wall 70 of the form 68 has a substantially cup-shaped member 71 disposed in position thereon with the closed end 72 of the member 71 seated against the inner face of the side wall 70 by suitable fastening means such as nails or spikes 73. The cup-shaped member 71 projects substantially perpendicular to the side wall 70 with the inner end 73 of the member 71 facing inwardly from the wall 70 in a substantially horizontal direction.

A collar 74, having a radially outwardly projecting annular flange 75 on the outer periphery thereof, is mounted in the open end of the cup-shaped member 71 with the flange 75 disposed in abutting engagement with the open end 73 thereof. The collar 74 has an intermediate portion 76 sloping radially inwardly from the flange 75, and also has a reduced diameter end portion 77 projecting outwardly from the intermediate portion 76 to thereby afford an outwardly facing shoulder 78 therebetween.

The collar 74 has a substantially frusto-conical shaped opening 79 extending horizontally therethrough, the large end of the opening 79 facing toward the wall 70 of the form 68.

It will be understood that the wall of the form 68 remote from the wall 70 will be identical to the wall 70, and will have a cup-shaped member and a collar 74 disposed thereon in directly horizontally aligned relation to each of the cup-shaped members 71 and collars 74 disposed on the wall 70.

With the form 68 so constructed, the cables, such as the cable 66, are strung thereacross between the respective oppositely disposed cup-shaped members 71 and collars 74, with both ends of the cables extending outwardly through the respective collars 74, cup-shaped members 71, and adjacent side walls of the form 68 in the same manner as the end 69 of the cable 66 shown in FIG. 9. After the cables have thus been positioned in the form 68 they may be pulled sufficiently tight therein that they extend substantially horizontally, and the respective ends thereof may be secured to the form 68 by suitable means such as collars 80 mounted on the outer end portions of the cables and clampingly secured thereto by bolts 81 in abutting engagement with the outer face of the adjacent side wall of the form 68. When the cables are so disposed in the form 68, the coating 67 thereon extends into the inner ends of the openings 79 in the respective collars 74, but preferably extends outwardly no further than the inner end portions of the openings 79. The coating 67 may be any suitable material for preventing the adherence of concrete to the cables, but I prefer the coatings to be a sleeve of suitable plastic material such as, for example, polyethylene.

Thereafter, the concrete, such as the concrete 65 may be poured into the form 68 around the cables 66, the cup-shaped members 71 and the collars 74 mounted therein preventing the concrete from contacting the ends of the cables 66 disposed outwardly of the inner ends of the collars 74, and affording cavities 82 in the portions of the outer faces of the concrete 65 occupied by the respective cup-shaped members 71 and collars 74.

In such a method of making concrete, after the concrete 65 has hardened in the form 68 to the desired compression strength around the cables disposed in the form, the collars 80 may be loosened and the form 68 removed from the concrete 65, thus removing the cup-shaped members 71 from the concrete 65 and thereby uncovering the cavities 82 left in the concrete 65. Two wedge-shaped clamping jaws, such as, the jaws 83 and 84, FIG. 8, may then manually be inserted through each of the cavities 82 into the opening 79 in each hof the collars 74 on opposite sides of the portion of the cable extending through the respective collar 74. The jaws 83 and 84 are of such size that when they are thus inserted into the respective collars, they project outwardly therefrom, and are disposed in such position that a pull on the cable extending therebetween in an inward direction relative to the surrounding respective collar 74 is effective to firmly wedge the jaws 83 and 84 into the respective collar 74, to thereby clamp the cable against inward movement relative to the collar. It will be noted that the flanges 75 on the collars 74 are embedded in the concrete 65 in such position as to effectively prevent the collars 74 from being dislodged from the concrete 65 in any direction.

After the jaws 83 and 84 have been thus disposed in the collars 64 surrounding the respective opposite ends of the cable 66, the free end portion 69 of the cable 66 may be inserted through the abutment member 31, and the passageways 30, 48, and 47 in the tensioning unit 1; and the front end of the housing 54 of the abutment member 31 may then be inserted into the opening 82 into abutting engagement with the shoulder 78 on the collar 74, as shown in FIG. 8. The front end portion of the housing 54 of the abutment member 31 is of such an internal diameter, forwardly of the annular flange 55 that when the front end of the abutment member 31 is disposed in such abutting engagement with the shoulder 78 the end portion 77 of the collar 74 is received therein with a relatively snug but freely slidable fit. When the abutment member 31 is so disposed on the collar 74, the outer ends of the jaws 83 and 84 project into the housing 54 into abutting engagement with the piston 57 in position to push the piston 57 rearwardly away from the shoulder 56 against the urging of the spring 60. Thus, the jaws 83 and 84 are yieldingly urged into the collar 74 toward clamping engagement with the cable 66.

With the tensioning unit 1 disposed in such position relative to the collar 74, it may be actuated to thereby tension the cables 66 in the same manner as heretofore discussed with respect to the tensioning of the cables 62, shown in FIGS. 1 and 2, the other end of the cable 66 being held by the jaws 83 and 84 disposed in clamping engagement therewith on the other side of the concrete 65. Such tensioning of the cable 66 causes the latter to be drawn outwardly between the jaws 83 and 84, shown in FIG. 8, the spring 60 being ineffective to hold those jaws 83 and 84 against the cable 66 from being so drawn therebetween. However, it will be noted that at all times the piston 57 in the abutment member 31, shown in FIG. 8, is yieldingly urging the adjacent jaws 83 and 84 inwardly toward clamping engagement with the portion of the cable 66 disposed therebetween, and, therefore, when the operation of the fluid-actuated units 4 and 5 of the tensioning unit 1 is reversed to thereby release the tensioning unit 1 from the cable 66, the jaws 83 and 84, shown in FIG. 8, are immediately effective to move into the opening 79 in the sleeve 74, in which they are mounted, into firm, positive clamping engagement with the end portion 69 of the cable 66 to thereby hold the tension on the cable 66. The tensioning unit 1 may then be withdrawn from the opening 82 shown in FIG. 8 and the post-tensioning operation repeated on each of the other cables mounted in the concrete 65.

After the cables in the concrete 65 have thus been tensioned, the ends thereof may be cut off within the openings 82, outwardly of the jaws 83 and 84, and the openings 82 may then be filled with a suitable material, such as, for example, concrete to thus afford a smooth surface of the faces of the concrete 65 in which the cavities 82 were formed.

From the foregoing, it will be seen that the present invention affords a novel apparatus and a novel method for both pre-tensioning and post-tensioning cables in concrete, and the like.

Also, it will be seen that the present invention affords novel holding devices for holding post-tensioned cables in stressed concrete.

In addition, it will be seen that the present invention affords a novel and practical tensioning device, which is practical and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. An anchoring element for holding a cable in a predetermined stressed position in a cast concrete member, said anchoring element including
    (a) wall portions defining a central, frusto-conical bore extending therethrough from front to rear,
    (b) a flat front face portion extending radially outwardly from said central bore and terminating in an axially rearwardly extending shoulder portion,
    (c) a rearwardly extending central body portion disposed generally parallel to the axis of said central bore but tapering slightly inwardly and rearwardly thereof and terminating in an inwardly directed, radially extending flat rear jacking face portion, and
    (d) a rear annular centering flange portion surrounding the rear portion of said frustro-conical central bore portion.

2. An anchoring element as defined in claim 1 which also includes a plurality of segmented wedging elements removably disposed therein for imparting a one-way gripping action to a cable disposed between said wedging elements.

3. An anchoring block as defined in claim 1 which also includes a front annular flange portion disposed adjacent said central bore and extending forwardly of said flat front face portion.

4. An anchoring element as defined in claim 3 which includes a counterbored cut out portion in said front annular flange for receiving a portion of a tubular cable protector therein.

5. A combination cable-holding anchor element and positioning support therefor, including an anchoring element as defined in claim 1, and removably attached to said anchor member, a holder unit therefor, said holder unit including
    (a) a cylindrical outer supporting wall unit, and axially inwardly extending therefrom,
    (b) a rear flat face holding portion, said flat face holding portion including,
        (1) a centrally disposed cable-receiving bore therein, and
        (2) a plurality of fastener-receiving holes therein, said cylindrical outer supporting wall unit being press fitted in use into a tightly fitted position overlying said tapered central body portion of said anchor element, whereby said holder unit, when attached to a fixed member, will support said cable-holding anchor elements in a desired position and retain it in said position when concrete is poured thereover.

6. A combination anchor member and support therefor, as defined in claim 5 in which said cylindrical outer supporting wall unit has an outer surface which is non-adhesive relative to concrete, so that said holder unit may be readily withdrawn after said concrete has been poured thereover and has hardened to a self-supporting consistency.

7. A tensioning unit for tensioning a cable extending through a collar member having a reduced end portion projecting axially outwardly from a larger intermediate portion, with gripping means mounted in said end portion in position to holdingly grip said cable therein when moved into said end portion, said tensioning unit comprising:
    (a) an elongated supporting frame,
    (b) two hydraulic cylinders
        (1) mounted on said frame in parallel relation to each other, and (2) having pistons therein reciprocable longitudinally of said frame between
    (a') an extended position and
    (b') a retracted position relative to said frame,
(c) an abutment having
    (1) an end portion abuttingly engageable with said intermediate portion of such a member in surrounding relation to said reduced end portion thereof,
    (2) there being a passageway extending therethrough for the feeding of such a cable therethrough from said member,
    (3) an actuator element
        (a') movably mounted in said passageway for reciprocation toward and away from said end portion, and
        (b') disposed in position in said passageway to engage said gripping means when said end portion of said abutment means is so abuttingly engaged with said intermediate portion, and
    (4) spring means in said passageway and operatively engaged with said actuator element in position to yieldingly urge said actuator element toward said member when said abutment means are so engaged with said intermediate portion,
    (5) means for retaining at least a portion of said actuator element within said passageway,
(d) said abutment means being mounted on and movable with said pistons, and
(e) other gripping means mounted on and movable with said supporting frame in position to grip said cable on the opposite side of said abutment means from said member during movement of said pistons toward extended position, when said cable extends through said abutment means and is gripped by said other gripping means, and said abutment means is so engaged with said intermediate portion, to thereby tension said cable in said member and simultaneously yieldingly urge said first-mentioned gripping means toward gripping engagement with said cable.

8. A tensioning unit for tensioning a cable having a holding unit thereon, said holding unit provided with gripping means for holdingly gripping said cable therein, said tensioning unit comprising:
(a) a frame
(b) hydraulically-reciprocable elongated members mounted on said frame and adapted to be reciprocated longitudinally between extended and retracted positions relative to said frame,
(c) an abutment member
    (1) mounted on said frame and normally disposed with one end thereof contiguous said holding unit during the tensioning operation,
    (2) there being a passageway extending through said abutment member for the feeding of said cable therethrough from said holding unit,
    (3) an actuator element movably mounted in said passageway for reciprocation toward and away from the end of said abutment member contiguous said holding unit, and
        (a') normally adapted to operate said holding unit gripping means when said abutment member is contiguous said holding unit,
    (4) spring means in said passageway and operatively engaged with said actuator element in position to yieldingly urge said actuator element toward said holding unit when said abutment member is disposed contiguous thereto,
(d) cable chuck means mounted on and movable with said elongated members in position to grip said cable on the opposite side of said abutment member from said holding means during movement of said elongated members toward extended position when said cable extends through said abutment member and is gripping by said cable chuck means and said actuator element is so disposed to said holding unit to operate said holding unit gripping means.

9. The tensioning unit as defined in claim 8 including means for retaining at least a portion of said actuator element within said passageway.

10. The tensioning unit as defined in claim 8 wherein said cable chuck means includes:
(1) a base having a wedge-shaped slot therein,
(2) two clamping jaws having
    (a) concave faces disposed in facing relation to each other, and
(3) tension coil springs connected between said base and said jaws in position to yieldingly urge said jaws toward the smaller portion of said slot and thereby urge said faces toward each other.

References Cited by the Examiner

UNITED STATES PATENTS

| | | | |
|---|---|---|---|
| 1,165,785 | 12/15 | Knoche | 24—136 |
| 1,435,486 | 11/22 | Leon et al. | 254—30 |
| 2,034,638 | 3/36 | Sarosdy. | |
| 2,056,036 | 9/36 | Catron et al. | |
| 2,411,678 | 11/46 | Cornella. | |
| 2,669,000 | 2/54 | Seemann. | |
| 2,695,754 | 11/54 | Karig. | |
| 2,982,520 | 5/61 | Sims | 254—29 |
| 3,081,976 | 3/63 | Carlson et al. | 254—29.5 |
| 3,099,109 | 7/63 | Hahn | 24—126 X |

FOREIGN PATENTS

| | | |
|---|---|---|
| 203,531 | 9/23 | Great Britain. |
| 503,304 | 6/51 | Belgium. |
| 692,354 | 6/53 | Great Britain. |
| 764,197 | 12/56 | Great Britain. |
| 599,501 | 11/59 | Italy. |
| 1,081,648 | 5/60 | Germany. |
| 623,857 | 7/61 | Canada. |
| 881,774 | 11/61 | Great Britain. |
| 894,240 | 4/62 | Great Britain. |
| 1,135,154 | 8/62 | Germany. |

OTHER REFERENCES

German printed application H 17,315, Vaessen, July 5, 1956.

DONLEY J. STOCKING, *Primary Examiner.*